United States Patent

[11] 3,633,757

[72] Inventor  Jean-Pierre Madern
    Route de Perpignan, Cabestany, France
[21] Appl. No. 757,943
[22] Filed  Sept. 6, 1968
[45] Patented  Jan. 11, 1972
[32] Priorities  Sept. 13, 1967
[33]  France
[31]  640;
    Mar. 1, 1968, France, No. 646

[54] FLUID FILTER
    6 Claims, 7 Drawing Figs.
[52] U.S. Cl. .................................................. 210/457,
    210/406, 210/407, 210/461, 210/487, 210/495,
    210/497, 55/379, 55/498, 55/500
[51] Int. Cl. .................................................. B01d 25/34,
    B01d 27/04
[50] Field of Search .................................................. 55/379,
    498, 500; 210/457, 461, 486, 487, 493, 495, 497,
    406, 407

[56]  References Cited
    UNITED STATES PATENTS
2,057,814  10/1936  Barrett .......................... 210/457
2,852,094  9/1958  Sawle ........................... 55/DIG. 31
3,096,281  7/1963  Smith et al. .................... 210/487
3,246,766  4/1966  Pall .............................. 210/457
3,377,783  4/1968  Young ........................... 55/379 X
3,392,846  7/1968  Getzin .......................... 55/521 X
3,419,151  12/1968  Smith et al. .................... 210/499 X
3,486,626  12/1969  Close ........................... 210/493 X
    FOREIGN PATENTS
1,323,368  2/1963  France .......................... 210/457
  671,495  2/1939  Germany ....................... 210/497
  885,539  12/1961  Great Britain ................. 210/457

Primary Examiner—Samih N. Zaharna
Assistant Examiner—Frederick F. Calvetti
Attorney—Ward, McElhannon, Brooks & Fitzpatrick ABSTRACT: A fluid filter including a support and a sheath of filtering material which is fixed to and covers the support. A plurality of longitudinally flexible plates are disposed radially about an axis and constitute the support and a plurality of cylindrical members having radial grooves in which the plates are engaged to hold them in position.

FLUID FILTER

This invention relates to fluid filters. Certain industries use fluids which must be free from impurities, and the purification of these fluids is normally performed by including one or more filters in the circuit in which the fluid is used.

Such filters can take several forms, and among these is known the type having a filtering sheath mounted on a support. The polluted fluid is contained, for example, in a tank from which it can only leave by passing through the filtering sheath of the filter immersed in the tank, the fluid thereby being separated from any impurities.

Experience has shown that filters of this type rapidly become fouled and require frequent cleaning. An even greater disadvantage is that these cleaning operations are not automatic, and this leads to wastage of time and involves unproductive operations.

It is possible to avoid these disadvantages, whilst producing an increase in the filtering efficiency, and a main object of the invention is to provide a filter of new design which is self-cleaning.

According to the invention, a filter comprises a support and a sheath of filtering material covering the support to which it is secured, the support being constituted by plates rapidly disposed about an axis and held in place by a plurality of cylindrical members having radial grooves in which the plates are engaged, the plates being slightly longitudinally flexible. The plates are preferably regularly disposed about the said axis.

In a preferred embodiment, the cylindrical members all have coaxial flanges which are fixed to the exterior of the cylinders and have radial grooves therein. One of said cylinders is closed and adapted to be disposed at one of the longitudinal ends of the plates. One of the cylinders at one of the longitudinal ends of the plates may be provided with a device, such as a screw joint, for connecting it to the filtering circuit. The thickness of the intermediate cylinders may be equal to that of the coaxial flange.

Moreover, the sheath may be fixed to the support by retaining rings which cooperate with grooves, which are preferably notched, located on the external periphery of each flange. The plates and cylinders are preferably of P.V.C., the retaining rings of Teflon, and the filtering sheath of polypropylene.

In order that the invention may be more fully understood, an embodiment in accordance therewith will now be described, by way of example, with reference to the accompanying drawings, in which.

Figure 1:
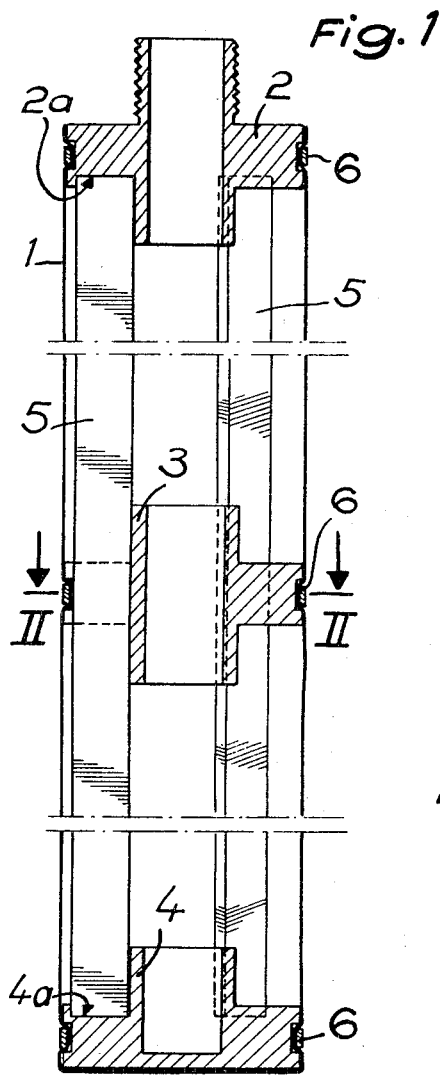
FIG. 1 is a sectional elevation of a filter of the invention.

In FIG. 1 showing an assembled filter, there will be seen a sheath 1 of filtering material, preferably polypropylene, which rests on holding members 2, 3 and 4 and around a cylindrical array of axially extending flexible plates 5. Although a single type of holding member can be used, three different types are shown in the example illustrated. The plates and holding members are preferably made from P.V.C., while the retaining rings 6 are made from Teflon.

Figure 2:
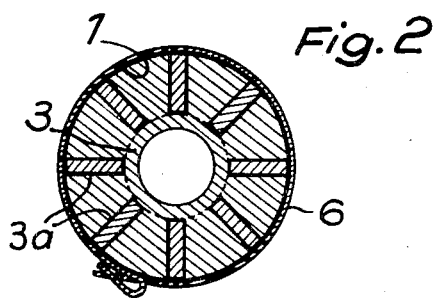
FIG. 2 is a section along the line II—II of FIG. 1.
Figure 4:
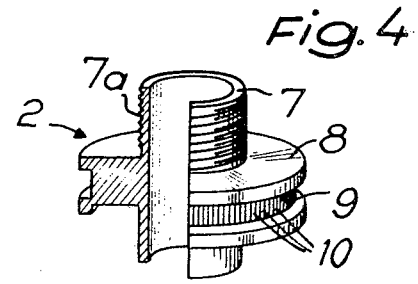
FIGS. 4, 5 and 6 are perspective views of holding cylinders of different types which may be used in a filter of the invention.
Figure 5:
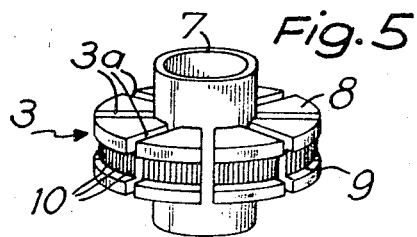
Figure 6:
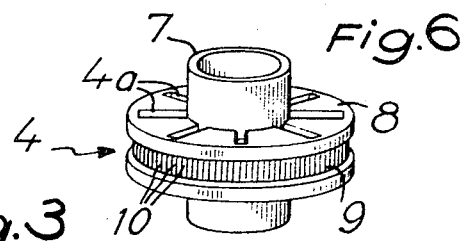
Figure 3:
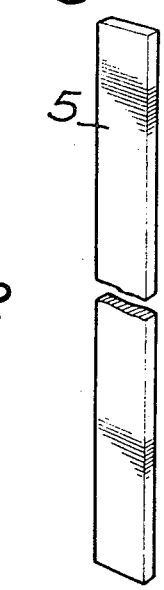
FIG. 3 is a perspective view of a plate of the filter shown in FIG. 1.
Figure 7:
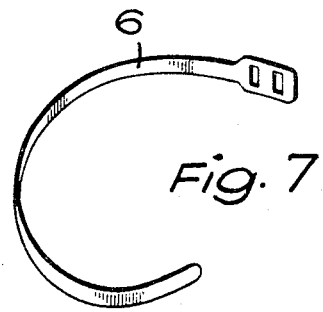
FIG. 7 shows a retaining ring for holding the sheath on the support.

FIG. 2 shows more clearly the regular radial disposition of the plates 5, which are of elongated parallelopipedic shape. The plates 5 are retained in radially extending grooves 2a and 4a in the support members 2 and 4 respectively and in radially extending slots 3a in the support member 3. The grooves 2a and 4a do not extend as far as the periphery of the flange 8, as can be seen in FIGS. 1 and 6, whereas the grooves 3a (FIG. 5) do extend to the periphery. Each holding member is constituted by a cylinder 7 and the coaxial flange 8, which latter embodies the radial grooves. The end members 2 and 4 have grooves of less depth than the thickness of the corresponding flange, whereas the intermediate members 3 have grooves 3a extending right through the flange. Moreover, each flange 8 has, in its outer periphery, a groove 9, the bottom of which is preferably provided with small projections 10 forming notches. As to the cylinders 7 of the holding members, these are hollow except for that of the member 4, which can be either solid, or hollow and closed at one end as can be seen in FIG. 6. Finally, the member 2 has a cylinder which is preferably threaded, at least at the end 7a on either its inner or outer surface.

Before use, the various component parts of the filter are assembled. The plates 5 are engaged in the grooves 3a of a desired number of intermediate holding members 3. Then, one of the ends of each of the plates 5 is engaged in the respective groove 4a of the member 4. The longitudinal edges of the plates rest on the outer faces of the cylinders 7, while the end is keyed in effect in the groove 4a which is closed both radially and axially. The other ends of the plates are capped by the member 2 with the same kind of key effect being produced between the grooves 2a and the plates as between the grooves 4a and the plates. The threaded connection 7a is located so as to extend outwardly of the filter. The assembly of the aforesaid components constitutes the support which is covered next by the sheath 1. The sheath is fixed on the support by placing the retaining rings 6 thereon at locations opposite the grooves 9. The material of the sheath is thus pressed to the bottom of the grooves and can no longer move with respect to the support, since it is held by the notches 10 which prevent it from sliding.

The filter thus made is immersed in a tank filled with fluid to be filtered, and connected to the filtering circuit by its screw joint 7a, so that the fluid passes, for example, from the exterior to the interior of the filter, and in passing through the sheath 1 is rid of its impurities. Under the effect of the pressure, the sheath rests on the plates 5 and the holding members 2, 3 and 4 and press thereon with greater and greater force as foreign bodies collect on the sheath. The plates 5 flex slightly under the force of this, until the moment when a slight variation in pressure causes their sudden release. This return movement of the plates 5 causes the sheath 1 to be violently shaken and the accumulated layer of foreign bodies becomes separated from the sheath 1. Thus, the filter is, in effect, self-cleaning during operation. The advantage of such a feature, which eliminates all stops and all time wastage, and which also improves the efficiency of the filtration due to the filtering sheath never becoming excessively loaded with impurities in view of its frequent self-cleaning, will be appreciated.

Although only one embodiment of the invention has been described, it will be understood that modifications may be made thereto. Thus, holding members such as that designated 3 can be modified by threading at one or both of their cylindrical ends. It is also possible to use a plug with a rim of greater diameter than that of the flange 8 of the member 3, in order, on the one hand, to block the cylinder 7 and, on the other hand, to close the grooves 3a. The element thus obtained acts in the same way as the member 4. In the same way, if the threading 7a of the cylinder 7 of the member 2 had not been provided, a threaded joint could be used and fixed to the flange 8 by means of a flange, for example, which would lead to the same result. It is also clear that the flange 8 need not necessary be located in the central portion of the cylinder.

Similarly, a hollow cylindrical tube can be passed through the holding members. Provided with a number of orifices through its lateral wall, it is used to limit deformation of the plates. This safety tube thus limits the flexing of the plates during operation of the filter to a value below that at which they undergo permanent deformation.

The invention is thus not limited to the embodiment described, but covers any variants which can be made thereto without departing from its scope.

What is claimed is:

1. A cylindrical fluid suction filter which comprises:

an internal support having at least two end members, one of said members having a bore adapted for mounting a suction tube thereon, said members each having a plurality of radial grooves on their inwardly facing sides;

a plurality of elongate longitudinally flexible plates extending between said end members and arranged radially about the axis of said filter with their ends engaged in said radial grooves; and a flexible filter sheath fixed to said end members and enclosing said plates, said sheath acting under pressure differentials between the interior and exterior of said filter to flex said plates whereby upon changes in said pressure differential, said plates will shake and cause said sheath to cleanse itself of foreign particles collected thereon.

2. A filter according to claim 1, wherein the plates and the cylindrical members are made of P.V.C.

3. A filter according to claim 1, wherein the filter sheath is made of polypropylene.

4. The filter according to claim 1 wherein there is further provided intermediate support members positioned between said end members, said intermediate members having a bore extending therethrough and being provided with radially extending slots to accommodate said elongate plates.

5. The filter according to claim 4 wherein said support members include a coaxial flange defining a circumferential groove and said filter further includes retaining rings adapted to cooperate with said circumferential groove to fix said filter sheath therein.

6. A filter according to claim 5, wherein the retaining rings are made of Teflon.

* * * * *